United States Patent [19]

Hendricks et al.

[11] Patent Number: 4,827,135

[45] Date of Patent: May 2, 1989

[54] HIGH SPEED CURVED POSITION SENSITIVE DETECTOR

[75] Inventors: Robert W. Hendricks, Montgomery County, Va.; Jack W. Wilson, Knox County, Tenn.

[73] Assignee: Technology for Energy Corporation, Knoxville, Tenn.

[21] Appl. No.: 27,651

[22] Filed: Mar. 19, 1987

[51] Int. Cl.[4] .......................... G01T 1/18; H01J 47/00

[52] U.S. Cl. ....................................... 250/374; 313/93

[58] Field of Search .................... 250/374, 385; 313/93

[56] References Cited

U.S. PATENT DOCUMENTS

| | | | |
|---|---|---|---|
| 3,603,797 | 9/1971 | Borkowski | 250/379 |
| 3,786,270 | 1/1974 | Borkowski et al. | 250/385 |
| 4,320,299 | 3/1982 | Batemen et al. | 250/374 |
| 4,682,964 | 7/1987 | Steele et al. | 250/385 X |

*Primary Examiner*—Gene Wan
*Attorney, Agent, or Firm*—Pitts and Brittian

[57] ABSTRACT

A high speed curved position sensitive porportional counter detector for use in x-ray diffraction, the detection of 5–20 keV photons and the like. The detector employs a planar anode assembly of a plurality of parallel metallic wires. This anode assembly is supported between two cathode planes, with at least one of these cathode planes having a serpentine resistive path in the form of a meander having legs generally perpendicular to the anode wires. This meander is produced by special microelectronic fabrication techniques whereby the meander "wire" fans outwardly at the cathode ends to produce the curved aspect of the detector, and the legs of the meander are small in cross-section and very closely spaced whereby a spatial resolution of about 50 μm can be achieved. All of the other performance characteristics are about as good or better than conventional position sensitive proportional counter type detectors. Count rates of up to 40,000 counts per second with 0.5 μs shaping time constants are achieved.

17 Claims, 6 Drawing Sheets

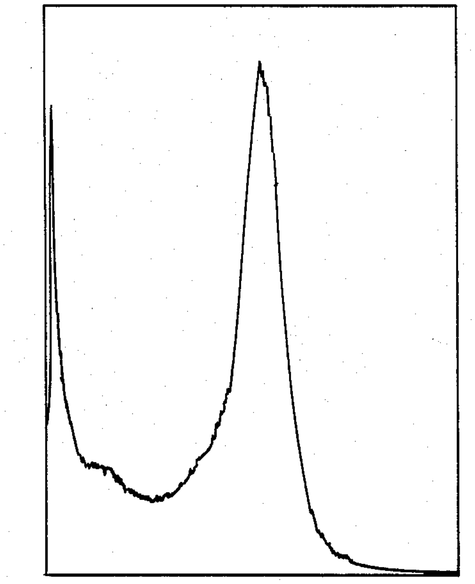
FIG. 8A
FIG. 8B
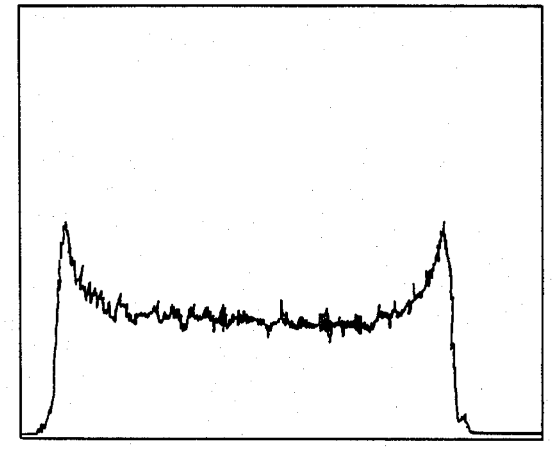
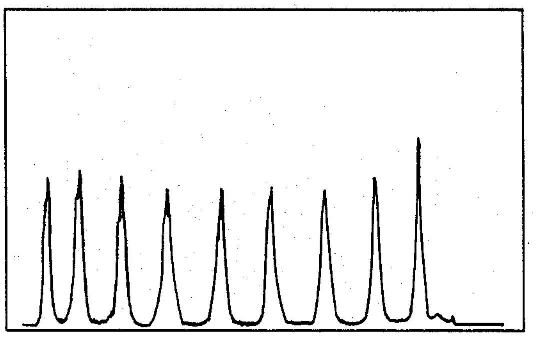
FIG. 8C

HIGH SPEED CURVED POSITION SENSITIVE DETECTOR

TECHNICAL FIELD

The present invention relates generally to proportional counters for determining the presence of ionizing radiation, and more particularly to a curved position sensitive detector for the detection of x-rays and to a method for producing a cathode therefor.

BACKGROUND OF THE INVENTION

Proportional counters are one of the typical types of devices used for determining the presence of ionizing radiations and to determine the quantity and energy thereof. Such devices utilize an anode typically in the form of one or more wires maintained at a selected potential, and one or more cathodes at some lesser potential. Alternatively, the anode can be at ground potential, and the cathode(s) at a negative potential, or the cathode(s) at ground potential and the anode at some positive potential. The counters are filled with a gas of a type wherein interaction with the ionizing radiation produces charged particles that move to the anode and cathode(s).

A special form of proportional counters is a position sensitive proportional counter whereby the position within the counter of the interaction of the radiation (e.g., x-ray) with the gas can be determined. This position information is obtained by analyzing the signal produced on the anode or the cathode as a function of the point closest to that at which the interaction occurs. In order to obtain this signal, the anode (or the cathode if that is to be used), must have a given resistance. Typically, the anode wires are carbon-coated wires. An alternative anode wire is very fine stainless steel. In one type of position sensitive proportional counter, a cathode thereof is made of a serpentine-type resistance wire supported upon a substrate, with opposite ends thereof connected to circuitry to determine the point of initiation of a signal along that serpentine wire.

These position sensitive detectors of the prior art present certain problems in their construction and use. For example, the carbon-coated anode wires have a limited lifetime due to their contamination by the radiation-induced decomposition of the counter filling gas. This problem also affects very fine metallic anode wires. With carbon-coated fibers this changes the resistance, usually non-uniformly. For metal wires, the resistance does not change but the wire diameter increases resulting in a decrease in the gain. These changes result in degredation of both the spatial and the energy resolution. Furthermore, anode wires are only very difficulty shaped to produce a curved position sensitive proportional counter.

Certain of the prior art position sensitive proportional counters have utilized a cathode formed by a resistance wire "meandering" across a support substrate in a generally serpentine path. These are typically 25 μm wires hung on various spring, glass, or other supporting devices. For many applications, the spacing between adjacent wires is 1–2 mm and such construction is relatively easily accomplished. However, the wires or meanders are each parallel to each other. This spacing is much too great, however, to achieve high linear position resolution (e.g., 50 μm) needed for crystallographic and diffraction research with x-rays. For this resolution a spacing of 100–150 μm is optimum. However, when the spacing of wires is reduced to, for example, about 250 μm, electrostatic interactions between adjacent wires cause serious problems of wire displacement and thus erode spacial resolution of the counter.

Accordingly, it is one object of the present invention to provide a high speed position sensitive detector wherein multiple metallic anode wires of relatively large diameter are arranged so as to distribute space charge within the detector over a wide area thus leading to both a longer detector lifetime and a higher count rate capability.

It is also an object to provide a high speed position sensitive proportional counter having a cathode meander wherein adjacent portions thereof are spaced at 100–150 μm.

It is another object of the invention to provide a method for producing a cathode for a high speed position sensitive proportional counter, the cathode having a meander wherein adjacent portions thereof are spaced at 100–150 μm.

It is another object of the present invention to provide a method by which the wires of a cathode "meander" are not parallel to each other, but are formed on the spokes of a wheel in order to make possible the detection of x-rays from a point source without parallax.

It is a further object of the present invention to provide a high speed curved position sensitive proportional detector for use in x-ray diffraction instruments, with a spacial resolution of at least 50 μm.

These and other objects of the present invention will become more apparent upon a consideration of the following figures and a detailed description thereof.

SUMMARY

In accordance with the present invention, there is provided a high speed position sensitive proportional counter particularly useful for x-ray studies so constructed that an x-ray beam passes in a parallel fashion through a volume between a plane of anode wires and a resistive cathode having a meander wherein adjacent portions are 100–150 μm apart. A second cathode is parallel to, and on the opposite side of, the anode wire plane. The detector is filled with a suitable gas, for example a mixture of xenon and methane ($CH_4$) or xenon and carbon dioxide ($CO_2$), at a suitable atmosphere. Furthermore, the cathode is formed in a polar coordinate meander array thus allowing parallax-free photon detection from a point source of the radiation. Through the use of metal for both the anode and cathode a substantially increased speed is achieved.

BRIEF DESCRIPTION OF THE DRAWINGS

FIG. 8A is a plot of an energy spectrum (of Fe-55) utilized to determine the performance of the detector of FIG. 1.

FIG. 8B is a plot of a typical "pedestal" observed during the performance of the detector of FIG. 1 using, as the filling gas, one atmosphere of 90% Xe-10% $CH_4$ when the x-ray source uniformly illuminated the detector from a distance of one meter.

FIG. 8C is a plot of a typical position sensitivity achieved during performance testing of the detector of FIG. 1 under the same condition except a mask having twenty-one 0.5 mm wide slits at 5.0 mm spacing was placed over the detector face with the slits perpendicular to the entrance slot to the detector.

DETAILED DESCRIPTION

Figure 1:
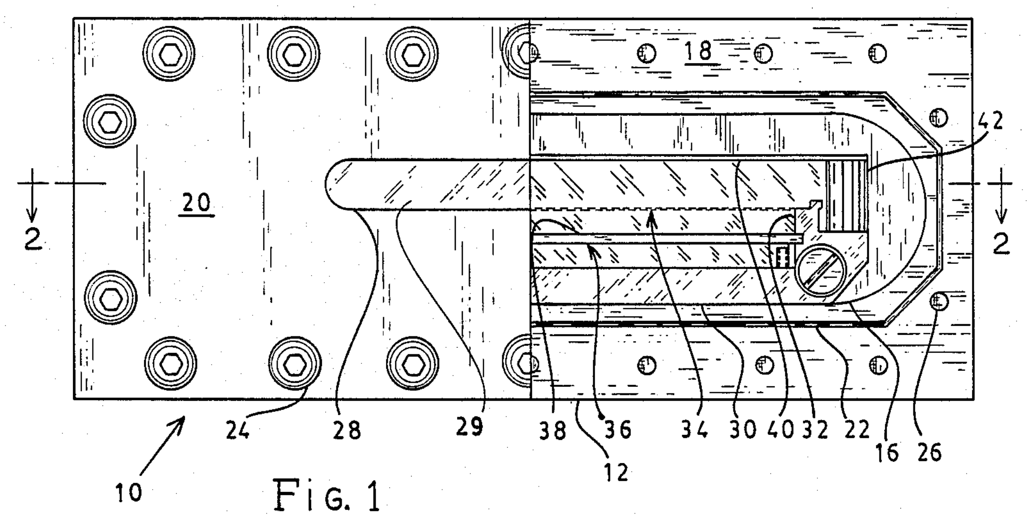
FIG. 1 is a front view of a position sensitive proportional detector of the present design with a portion of the cover plate (containing an entrance slit) removed.
Figure 2:
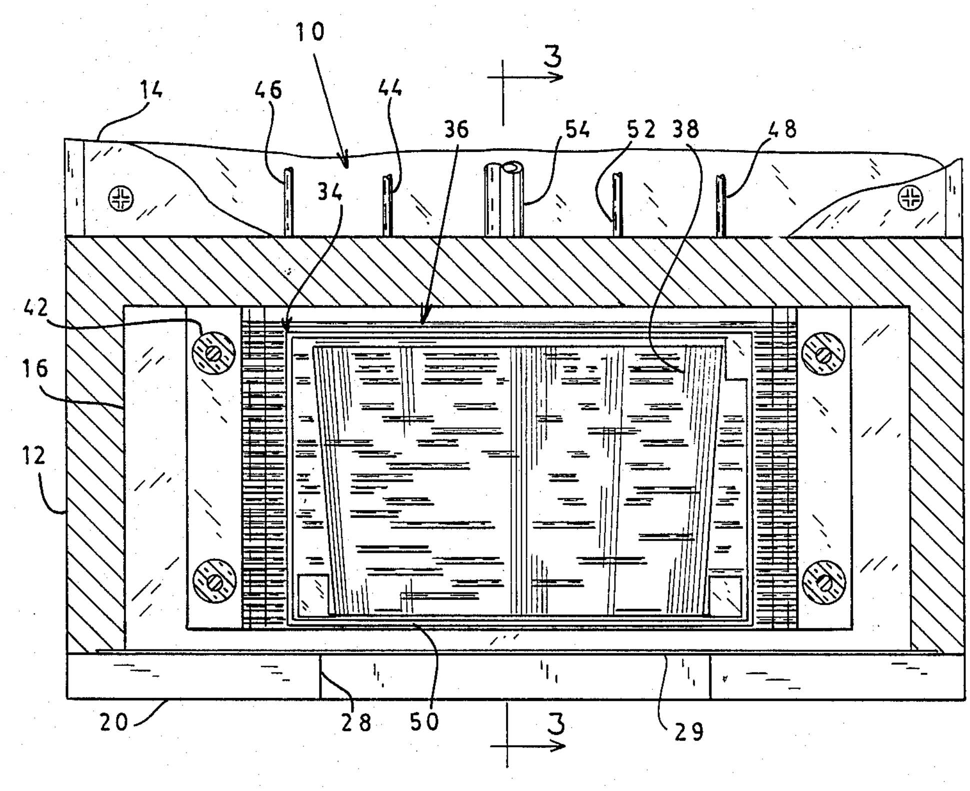
FIG. 2 is a longitudinal cross-sectional drawing of the detector of FIG. 1 taken at 2—2 thereof.
Figure 3:
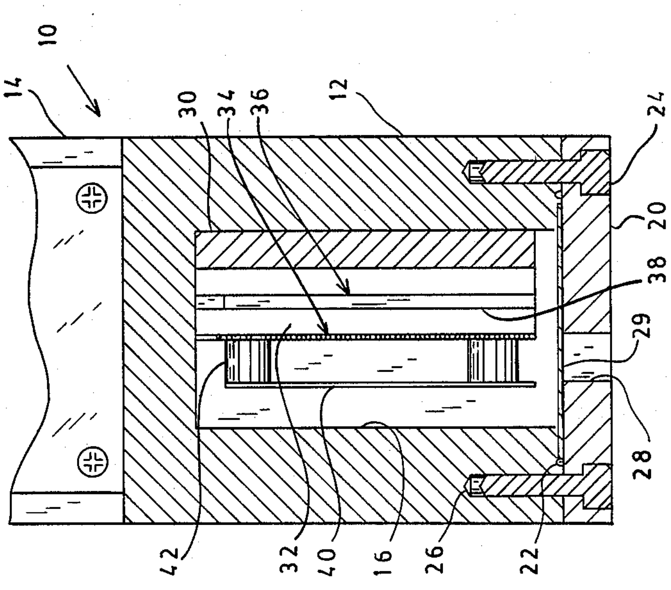
FIG. 3 is a transverse cross-sectional drawing of the detector of FIG. 1 taken at 3—3 of FIG. 2.

One embodiment of the present invention is shown generally at 10 in FIGS. 1 through 3. In this embodiment there is provided a body 12 which supports a suitable frame 14 for electrical components associated with the detector. This body is provided with a central cavity 16 within which are situated the essential components of the detector. The body defines a flat face 18 at the entrance to the cavity 16, and this entrance is closed with a removable faceplate 20. A suitable gasket 22 is provided between the body face 18 and the faceplate 20, and the faceplate is attached using suitable screws as shown at 24 threaded into tapped holes 26 provided in the body 12. The faceplate 20 is provided with an elongated slot 28 by which photons enter into the detector. A "window" 29 positioned between the face plate 20 and the body face permits passage of the photons, but maintains a vacuum within the cavity 16. This window is typically a thin foil of beryllium.

Figure 4:
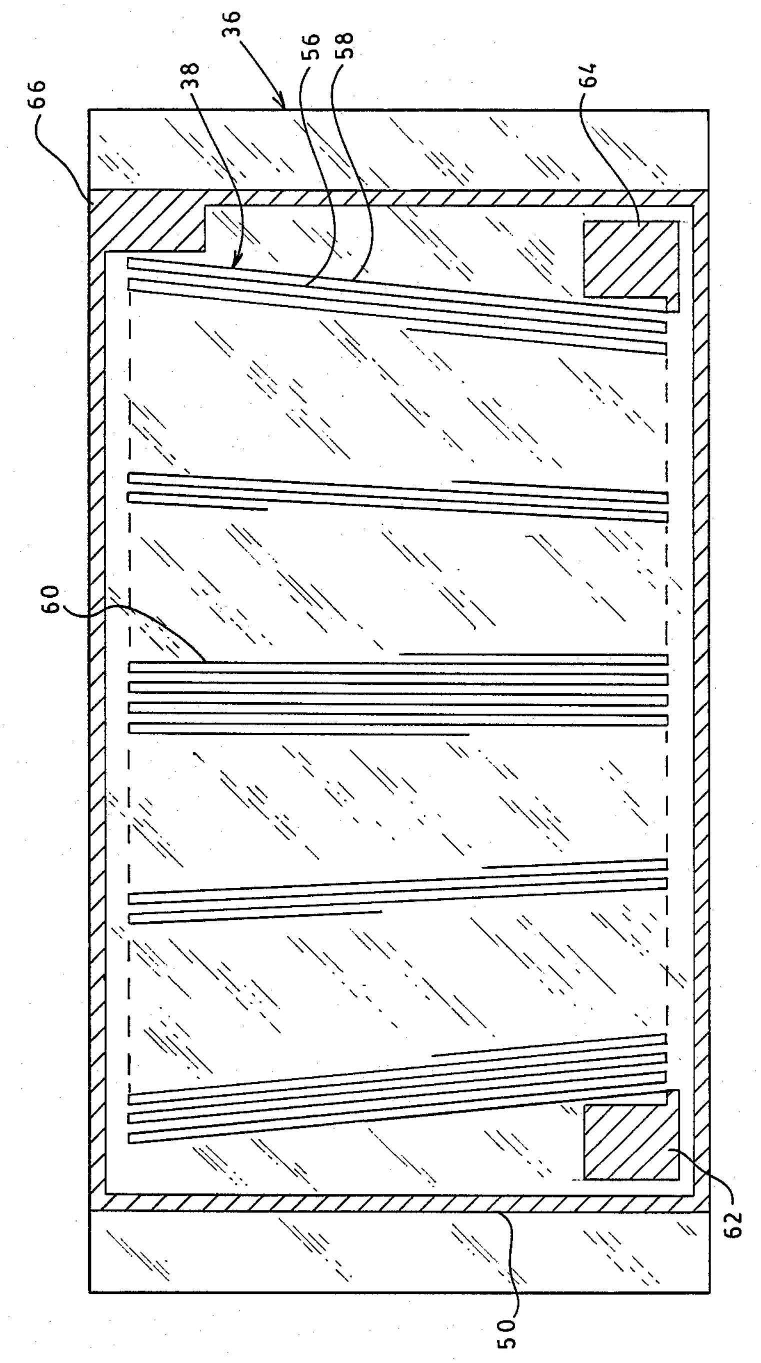
FIG. 4 is a plan drawing of a cathode substrate upon which is created the desired cathode meander (spacing exaggerated), and showing a guard ring and contact points for the guard ring and opposite ends of the cathode.

As stated above, the active elements of the detector 10 are positioned within the cavity 16. In this particular embodiment, there is provided a support base 30 with upstanding anodes support end members 32 (one shown; the other is symmetrically positioned at the opposite end of the support base 30). From these end members are supported a plurality of parallel metallic anode wires 34 each lying in a plane substantially parallel with the path of photons entering through slot 28. These wires are typically stainless steel having a diameter of 0.001 inch and a spacing of 0.2 inch. The array can have larger "guard" wires of 0.005 inch diameter at edges of the array. Also, mounted from these end members 32 is a cathode substrate 36 to which is applied a cathode meander 38 by a method described hereinafter. This cathode meander, which is described in greater detail with regard to FIG. 4, is on a side of the substrate directed toward the anode wires 34 and is in a plane parallel with the anode wires. A second cathode 40 of conventional construction (or also having a cathode meander) is mounted from the support base 30, as with insulators 42, and is parallel with the plane of the anode wires. The alignment of the second cathode 40 and the anode wires is such that photons entering the slot 20 pass into the volume between these two elements.

As stated above, a power supply generates a relatively strong electric field between the cathodes and the anode wires perpendicular to the direction of the photons. In this embodiment, a potential is applied to the second cathode 40 via lead 44 (see FIG. 2), and opposite ends of the cathode meander 38 are connected to output leads 46, 48. As will be discussed with regard to FIG. 4, the cathode substrate is provided with a guard ring 50 and this is supplied a potential (e.g., ground) via lead 52.

As stated above, the detector contains a dielectric gas medium in the region between the anode wires and the cathodes. A photon causes ionization in the gas medium, and a charge is produced that is proportional to the incident energy. Since the cathode meander acts as a long voltage divider, the relative voltage measured at the leads 46, 48 is proportional to the position of the ionizing event relative to the length of the cathode meander. A fill tube 54 is provided to introduce the appropriate gas medium into the cavity 16. Normally the detector is sealed. However, it can be operated in a flow-through manner by providing a second gas tube and thus have an entrance and exit.

The principal feature of the present invention is the cathode meander construction and its method of fabrication. Referring now to FIG. 4, shown therein is a plan view of the cathode substrate 36 with the cathode meander 38 indicated. The spacing of adjacent "legs" of the meander (e.g., at 56, 58) has been exaggerated in this figure for clarity. In this embodiment, the legs fan out symmetrically from a centerline such that outer legs (e.g., leg 58) is at an angle of about 6 degrees (focal angle) with respect to a central leg (e.g., leg 60). Of course, other orientations are possible and would be chosen depending upon the angular orientation of x-rays entering the slot 28 of the device or upon the distance of the sample from the face of the detector.

Opposite ends of the cathode meander 38 are joined to solder pads 62, 64. These solder pads provide for connection to the leads 46, 48 (FIG. 2) when the cathode substrate 36 is mounted from the base 30 As stated above, a narrow cathode guard ring 50 is provided on the cathode substrate 36 surrounding the meander 38 to prevent spurious voltages from affecting signals carried by the cathode meander. This guard ring 50 also has a solder pad 66 for similar connection to its lead 52. The guard ring and solder pads are of any suitable conductive material (e.g., gold) and can be produced on the cathode substrate by any suitable method as by vapor deposition through a suitable mask.

Very close and uniform spacing of the legs of the cathode meander must be achieved for high resolution. For example, the spacing must be about 100–150 μm. The width of each leg is only a few μm (e.g., 10 μm), and the thickness is typically 1–2 μm. The desired resistance of the cathode meander is 25,000 (±20%) ohms. This latter requirement restricts the total length of the meander and the cross-section of each leg. The total resistance, R, can be determined from the equation $$R=\rho l/s=\rho[nb-(n-l)d]/xy$$

where:

- $\rho$ is the resistivity of the material used for the meander,
- l is the total length,
- s is the cross-sectional area,
- n is the number of legs,
- b is the length of each leg,
- d is the spacing between legs,
- x is the width of each leg, and y is the thickness of each leg.

Figure 5A:
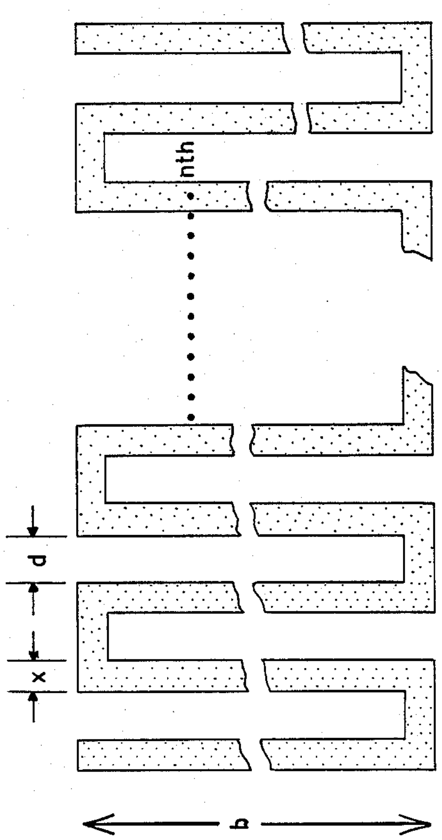
FIGS. 5A and 5B are enlarged views of the cathode meander utilized in the present invention showing the various dimensions that affect the total end-to-end resistance of the meander.
Figure 5B:
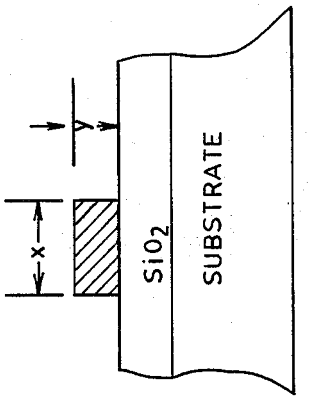

These variables are illustrated in FIG. 5. With gold, for example, having a resistivity of 2.44 microohm-cm, with d equal to 100 μm (microns), x can be 10 microns, and y will be about 1 μm (9227 angstroms) for n equals 256, or about 2 μm (18,454 angstroms) for n equal 512 (b chosen as 1.45 in).

Figure 6A:
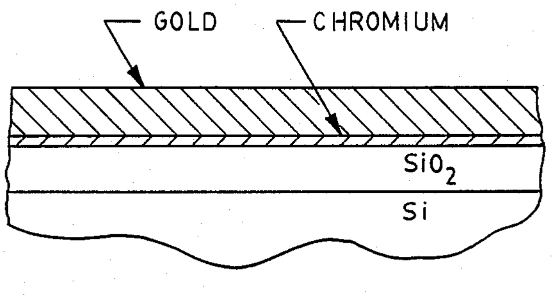
FIGS. 6A, 6B, and 6C illustrate the various steps involved in one of the preferred methods of producing a cathode meander for the present invention.

One suitable method for producing a cathode meander of these small dimensions is illustrated in FIG. 6. This method is similar to photolithographic methods applied to microelectronics fabrication. For this particular method, a silicon substrate is illustrated. It should be understood that other suitable insulator substrates can be used such as glass, magnesia (MgO), alumina ($Al_2O_3$), etc. For the silicon embodiment, a layer (5000 angstroms) of silicon dioxide ($SiO_2$) is first created by oxidation and then a very thin (e.g., 500 angstroms) prelayer of chromium is applied. The $SiO_2$ provides further insulation, and the chromium assures strong adhesion of the cathode meander metal to the oxide. Finally, a layer of the meander metal, e.g., gold, is deposited to a thickness corresponding to the desired thickness of the cathode meander. As indicated above, this thickness will vary from about 1 to about 2 microns depending upon the number of legs of the meander and the other variables of the above-cited equation. These various layers are illustrated in FIG. 6A.

Figure 6B:
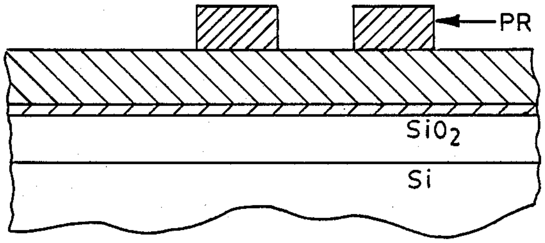
Figure 6C:
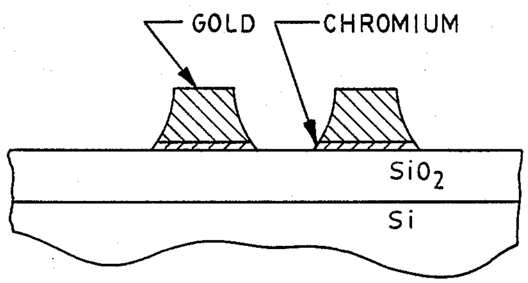

As indicated in FIG. 6B, a photoresist (PR) layer is added, exposed to provide a desired pattern, and "developed" to leave the gold layer exposed and to define the spaces between the legs of the cathode meander. Then, as indicated in FIG. 6C, the gold (and chromium) are etched away to define the spacing, and the remaining photoresist removed so as to produce the cathode meander. This process is referred to as a "direct etch".

A very similar method, known as a "lift-off" process, is also suitable for the production of the cathode meander. In this method, the unwanted part of the patterned film is lifted off with the emulsion leaving behind the desired meander metal pattern. For this, the photoresist layer is applied and properly patterned before the chromium and gold are deposited. This necessitates extreme cleanliness of the surface.

A position sensitive detector constructed according to the design shown in FIGS. 1–3, and with a cathode simulating the meander illustrated in FIG. 4, was tested to determine performance. For this particular model, the anode unit had six wires 0.001 inch wires and the filling gas was 90% Xe–10% $CH_4$ at one atmosphere. The cathode meander occupied an area of 2.0 by 1.45 inches on a substrate of 3.0 by 1.6 inches. The anode wires were spaced 5.0 mm apart. An iron-55 monoenergetic source was used for the test x-ray beam, this source was positioned at a point about one meter from the entrance slot.

Figure 7:
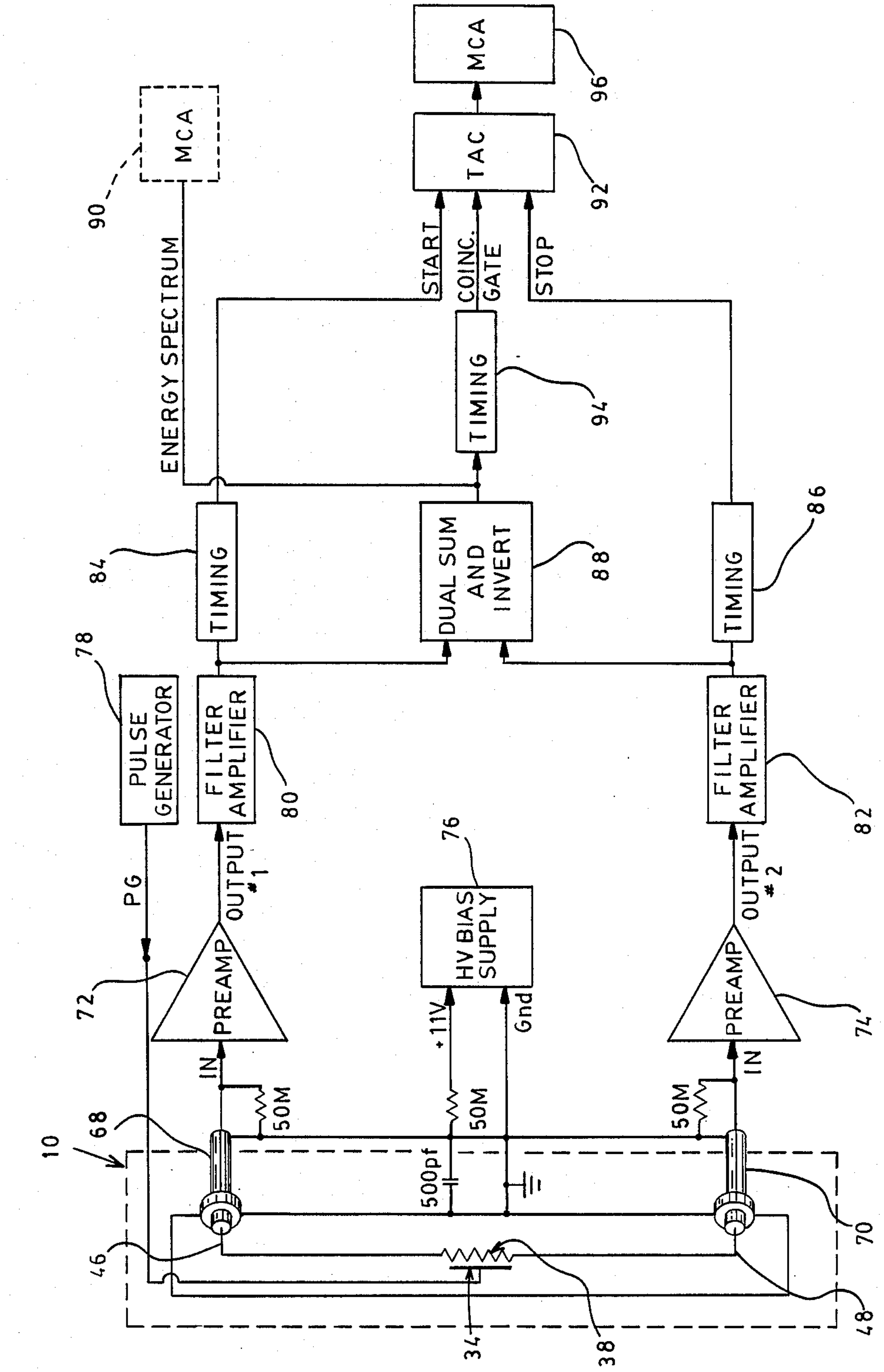
FIG. 7 is a schematic circuit diagram used with the detector of FIG. 1.

The sensor was connected into the circuit illustrated in FIG. 7. The leads 46, 48 from the ends of the cathode meander 38 passed through feed-through insulators 68, 70, respectively, to individual preamplifiers 72, 74. A voltage gradient was produced within the detector using a high voltage bias supply 76. The anode wire array 34 was connected to a pulse generator 78 in these tests for generating a pulsed signal within the detector. Each of the preamplifier outputs were connected to filter amplifiers 80, 82, respectively, with outputs therefrom fed into timing circuits 84, 86, in the form of single channel analyzers. The amplifiers were also connected to a dual sum-and-invert circuit 88 for use in obtaining a signal corresponding to the energy spectrum of the x-ray photons through the use of a multichannel analyzer 90. The timing circuits 84, 86 provided "start" and "stop" signals to a time-to-amplitude converter (TAC) 92, with the coincidence gate signal for the TAC being derived from another single channel analyzer timer 94 (which derives its signal from the dual sum-and-invert circuit 88). The output of the TAC 92 then feed a second multichannel analyzer 96 for obtaining information as to the position of the ionizing event within the detector 10. The electronic components within the circuit of FIG. 7 are conventional off-the-shelf items, and their choice will be well known to those skilled in the art since this circuit is typical of those used in the art of position sensitive proportional detectors of other designs.

The test results of the prototype detector are illustrated in FIG. 8. FIG. 8A is a plot of the energy spectrum (of the Fe-55) as produced by multichannel analyzer 90. With the source uniformly illuminating the slot 28 the response (pedestal curve), as determined by multichannel analyzer 92, was as depicted in the plot of FIG. 8B. The spacial resolution of the detector was measured in the same geometry except that a mask was positioned over the entrance slot. This mask had twenty-one 0.5 mm wide slits spaced 5.0 mm apart. These slits were perpendicular to the long dimension of the entrance slot. A plot of the spatial response with this mask in place, as obtained from multichannel analyzer 92, is shown in FIG. 8C.

Operation of this prototype with 0.5 μs shaping time constants indicates a countrate limit of about 40,000 counts per second for 10% coincidence losses. This is approximately six times better than a straight detector with carbon-coated quartz fibers and 3 μs shaping time constants. The energy resolution was approximately 21% FWHM at 5.9 keV, a value close to the observed value of 13% for a "standard" non-position sensitive detector. Furthermore, this prototype achieved a spatial resolution of about 1 mm FWHH consistent with a cathode meander spacing of about 1.6 mm in this prototype having a simulated cathode meander. Accordingly, a spatial resolution of about 50 μm can be expected with a cathode meander of the type shown in FIG. 4 and FIG. 5.

From the foregoing, it will be recognized by those versed in the art that an improved position sensitive proportional detector has been developed. This provides high speed response and is an effective curved detector. Because of its construction and response, the detector has particular application in x-ray diffraction research. Although the detailed description is limited to one embodiment of the invention, there is no intent to limit the invention by that embodiment. Rather, the invention is to be limited only by the full description and by the appended claims and their equivalents when read in combination with the Specification and drawings.

We claim:

1. A high speed curved position proportional detector for x-rays, which comprises:

an anode array formed of a plurality of parallel metal wires in a plane with each wire arranged to be substantially perpendicular to a path of said x-rays;

a cathode substrate fabricated from an insulating material oriented substantially parallel with said anode array, said substrate being rectangular having a length and width substantially corresponding to a length and width of said anode array; and a cathode serpentine-shaped meander formed upon said substrate, said cathode meander having legs extending across said width of said substrate and aligned substantially parallel to said path of said x-rays and substantially perpendicular to said wires of said anode array, said legs of said cathode meander arranged to fan outwardly from a center point along one lengthwise edge of said substrate, said legs being about 10 to 15 m wide and spaced about 100 to 150 m apart, said cathode meander having a total resistance from a first end to a further end of about 25,000 ohms.

2. The detector of claim 1 wherein said fanned cathode meander produces legs adjacent ends of said substrate oriented at about 6 degrees to meander legs at said center point.

3. The detector of claim 1 wherein said cathode substrate is an insulating material selected from the group consisting of silicon, magnesia, alumina and glass.

4. The detector of claim 1 wherein said cathode meander is a metal selected from the group consisting of gold, aluminum, chromium, copper and tungsten.

5. The detector of claim 3 wherein said cathode substrate is silicon having a silicon dioxide coating, and said cathode meander is a deposit of gold.

6. The detector of claim 5 wherein said gold is bonded to said silicon dioxide by a layer of chromium deposited upon said silicon dioxide under said deposit of gold.

7. The detector of claim 1 wherein said legs of said cathode meander are square in cross-section.

8. A high speed curved position proportional detector for x-rays, which comprises:

an anode array formed of a plurality of parallel metal wires in a plane with each wire arranged to be substantially perpendicular to a path of said x-rays;

a rectangular cathode substrate oriented substantially parallel with said anode array, said cathode substrate being an insulator and having a length and width substantially corresponding to a length and width of said anode array; and a serpentine-shaped cathode meander formed upon said cathode substrate, said cathode meander having legs that fan outwardly across said width of said substrate from a center point along one lengthwise edge of said cathode substrate, said legs of said cathode meander being about 10 to 15 $\mu$m wide and spaced about 100 to 150 $\mu$m apart, said cathode meander having a total resistance from a first end to a further end of about 25,000 ohms.

9. The detector of claim 8 wherein said fanned cathode meander produces legs adjacent ends of said substrate oriented at about six degrees to meander legs at said center point.

10. The detector of claim 8 wherein said substrate is an insulating material selected from the group consisting of silicon, magnesia, alumina and glass.

11. The detector of claim 8 wherein said cathode meander is a metal selected from the group consisting of gold, aluminum, chromium, copper and tungsten.

12. The detector of claim 8 wherein said cathode substrate is silicon having a silicon dioxide coating, and said cathode meander is a deposit of gold.

13. The detector of claim 12 wherein said gold is bonded to said silicon dioxide by a layer of chromium deposited upon said silicon dioxide under said deposit of gold.

14. The detector of claim 8 wherein said cathode meander is square in cross-section.

15. The detector of claim 8 wherein said anode array and said cathode substrate are mounted within a chamber, said chamber filled with a gas selected from a group consisting of a xenon-methane mixture and a xenon-carbon dioxide mixture, said chamber being provided with a window to admit x-rays.

16. A high speed curved position proportional detector for x-rays, which comprises:

a substantially rectangular anode array formed of a plurality of parallel metal wires in a plane wherein each wire is arranged to be substantially perpendicular to a path of said x-rays, said anode array defining a length and a width;

a substantially rectangular cathode substrate oriented substantially parallel to said anode array, said cathode substrate defining a face toward said anode array and having a length and width corresponding to said length and width of said anode array, said cathode substrate fabricated from an insulator selected from the group consisting of silicon, magnesia, alumina, and glass;

a serpentine-shaped cathode meander formed upon said face of said cathode substrate, said cathode meander having legs aligned substantially parallel to said path of x-rays, said legs extending across said width of said cathode substrate and fanning outwardly from a center point along one lengthwise edge of said cathode substrate, said cathode meander formed from a metal selected from a group consisting of gold, aluminum, chromium, copper and tungsten, said legs of said cathode meander being about 10–15 $\mu$m wide and spaced about 100 to 150 $\mu$m apart, said cathode meander having a total resistance from a first end to a further end of about 25,000 ohms;

a chamber provided with walls defining cavity, said chamber provided with mounting means within said cavity for mounting said anode array and said cathode substrate, said chamber further provided with a gas-tight window for admitting x-rays into said cavity;

electrical leads penetrating said chamber walls into said cavity connected to said anode array and said cathode meander; and a gas filling within said cavity, said gas selected from a group consisting of a xenon-methane mixture and a xenon-carbon dioxide mixture.

17. The detector of claim 16 wherein said cathode substrate is silicon having a silicon dioxide coating, and said cathode meander is gold deposited over a layer of chromium.

* * * * *